United States Patent
Doddaiah et al.

(10) Patent No.: US 11,429,294 B2
(45) Date of Patent: Aug. 30, 2022

(54) EFFICIENT COMPRESSED TRACK SIZE CLASSIFICATION TO REDUCE DISK FRAGMENTATION AND INCREASE PROBABILITY OF IN-PLACE COMPRESSED WRITES

(71) Applicant: EMC IP HOLDING COMPANY LLC, Hopkinton, MA (US)

(72) Inventors: Ramesh Doddaiah, Westborough, MA (US); Anoop Raghunathan, Ashland, MA (US)

(73) Assignee: Dell Products L.P., Hopkinton, MA (US)

(*) Notice: Subject to any disclaimer, the term of this patent is extended or adjusted under 35 U.S.C. 154(b) by 218 days.

(21) Appl. No.: 16/881,107

(22) Filed: May 22, 2020

(65) Prior Publication Data
US 2021/0365198 A1  Nov. 25, 2021

(51) Int. Cl.
*G06F 3/00* (2006.01)
*G06F 3/06* (2006.01)

(52) U.S. Cl.
CPC .......... *G06F 3/0638* (2013.01); *G06F 3/0604* (2013.01); *G06F 3/0653* (2013.01); *G06F 3/0689* (2013.01)

(58) Field of Classification Search
CPC .... G06F 3/0638; G06F 3/0604; G06F 3/0653; G06F 3/0689
See application file for complete search history.

(56) References Cited

U.S. PATENT DOCUMENTS

| | | | |
|---|---|---|---|
| 2007/0150690 A1* | 6/2007 | Chen | G06F 3/0644 711/170 |
| 2017/0351602 A1* | 12/2017 | Oshimi | G11C 11/5628 |
| 2018/0138921 A1* | 5/2018 | Arelakis | G06F 3/0679 |
| 2021/0120013 A1* | 4/2021 | Hines | H04L 63/14 |

* cited by examiner

*Primary Examiner* — Craig S Goldschmidt
(74) *Attorney, Agent, or Firm* — Anderson Gorecki LLP

(57) ABSTRACT

In a data storage system in which a full-size allocation unit is used for storage of uncompressed data, an optimal reduced size allocation unit is selected for storage of compressed data. Changes in the compressed size of at least one full-size allocation unit of representative data are monitored over time. The representative data may be selected based on write frequency, relocation frequency, or both. Compression size values are counted and weighted to calculate the optimal reduced allocation unit size. The optimal reduced size allocation unit is used for storage of compressed data. A full-size allocation unit of data that cannot be accommodated by a reduced size allocation unit when compressed is stored uncompressed.

20 Claims, 7 Drawing Sheets

Bucket/Compressed Size of Representative Track

EFFICIENT COMPRESSED TRACK SIZE CLASSIFICATION TO REDUCE DISK FRAGMENTATION AND INCREASE PROBABILITY OF IN-PLACE COMPRESSED WRITES

TECHNICAL FIELD

The subject matter of this disclosure is generally related to data storage systems and more particularly to storage of compressed data.

BACKGROUND

High capacity data storage systems such as storage area networks (SANs) are used to maintain large data sets and contemporaneously support multiple users. A SAN includes a network of interconnected compute nodes that manage access to arrays of drives. The compute nodes respond to input-output (IO) commands from host applications that typically run on clustered servers (aka "hosts"). Examples of host applications may include, but are not limited to, software for email, accounting, manufacturing, inventory control, and a wide variety of other business processes.

SANs and other types of high capacity data storage systems typically compress some of the data stored on the managed drives. For example, host application data that is relatively infrequently accessed by the hosts may be compressed in order to reduce storage capacity requirements. Host application data that is relatively frequently accessed may be stored uncompressed so that is can be accessed with low latency. Although data compression tends to reduce storage capacity requirements there are potential drawbacks such as the need to relocate updated compressed data that compresses to a larger size and is therefore unable to be stored at its existing location.

SUMMARY

All examples, aspects and features mentioned in this document can be combined in any technically possible way.

In accordance with some implementations an apparatus comprises: a data storage system comprising: a plurality of compute nodes interconnected with a plurality of drives; at least one storage object on which data is logically stored, the storage objects being backed by the drives; and a compressed data manager that selects at least one full-size allocation unit of representative data, monitors changes in compressed size of the full-size allocation unit of representative data over time, selects a reduced size allocation unit for compressed data based on the changes in compressed size of the full-size allocation unit of representative data over time, and causes the compute nodes to use both the full-size allocation unit and the reduced size allocation unit for storage of data on the drives. In some implementations the storage system uses only one reduced size allocation unit for storage of compressed data. In some implementations the compressed data manager weights values of the monitored compressed size. In some implementations the compressed data manager weights the values of the monitored compressed size using weights W=Bucket Size Counter Value*(Bucket Size/100)$^P$, where P is a hyper parameter. In some implementations the compressed data manager selects at least one full-size allocation unit of representative data based on frequency of write operations. In some implementations the compressed data manager selects at least one full-size allocation unit of representative data based on frequency of relocation operations. In some implementations the compressed data manager selects a new reduced size allocation unit for compressed data based on changes in average compressed size of full-size allocation units of data.

In accordance with some implementations a method comprises: selecting at least one full-size allocation unit of representative data; monitoring changes in compressed size of the full-size allocation unit of representative data over time; selecting a reduced size allocation unit for compressed data based on the changes in compressed size of the full-size allocation unit of representative data over time; and using both the full-size allocation unit and the reduced size allocation unit for storage of data. Some implementations comprise using only one reduced size allocation unit for storage of compressed data. Some implementations comprise weighting values of the monitored compressed size. Some implementations comprise calculating a weight W=Bucket Size Counter Value*(Bucket Size/100)$^P$, where P is a hyper parameter. Some implementations comprise selecting based on frequency of write operations. Some implementations comprise selecting based on frequency of relocation operations. Some implementations comprise selecting a new reduced size allocation unit for compressed data based on changes in average compressed size of full-size allocation units of data.

In accordance with some implementations a computer-readable storage medium stores instructions that when executed by a computer cause the computer to perform a method for using a computer system to implement multiple allocation units for storage of data, the method comprising: selecting at least one full-size allocation unit of representative data; monitoring changes in compressed size of the full-size allocation unit of representative data over time; selecting a reduced size allocation unit for compressed data based on the changes in compressed size of the full-size allocation unit of representative data over time; and using both the full-size allocation unit and the reduced size allocation unit for storage of data. Some implementations comprise using only one reduced size allocation unit for storage of compressed data. Some implementations comprise weighting values of the monitored compressed size. Some implementations comprise selecting based on frequency of write operations. Some implementations comprise selecting based on frequency of relocation operations. Some implementations comprise selecting a new reduced size allocation unit for compressed data based on changes in average compressed size of full-size allocation units of data.

Other aspects, features, and implementations will be apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer.

Some aspects, features, and implementations described herein may include machines such as computers, electronic components, optical components, and processes such as computer-implemented procedures and steps. It will be apparent to those of ordinary skill in the art that the computer-implemented procedures and process steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
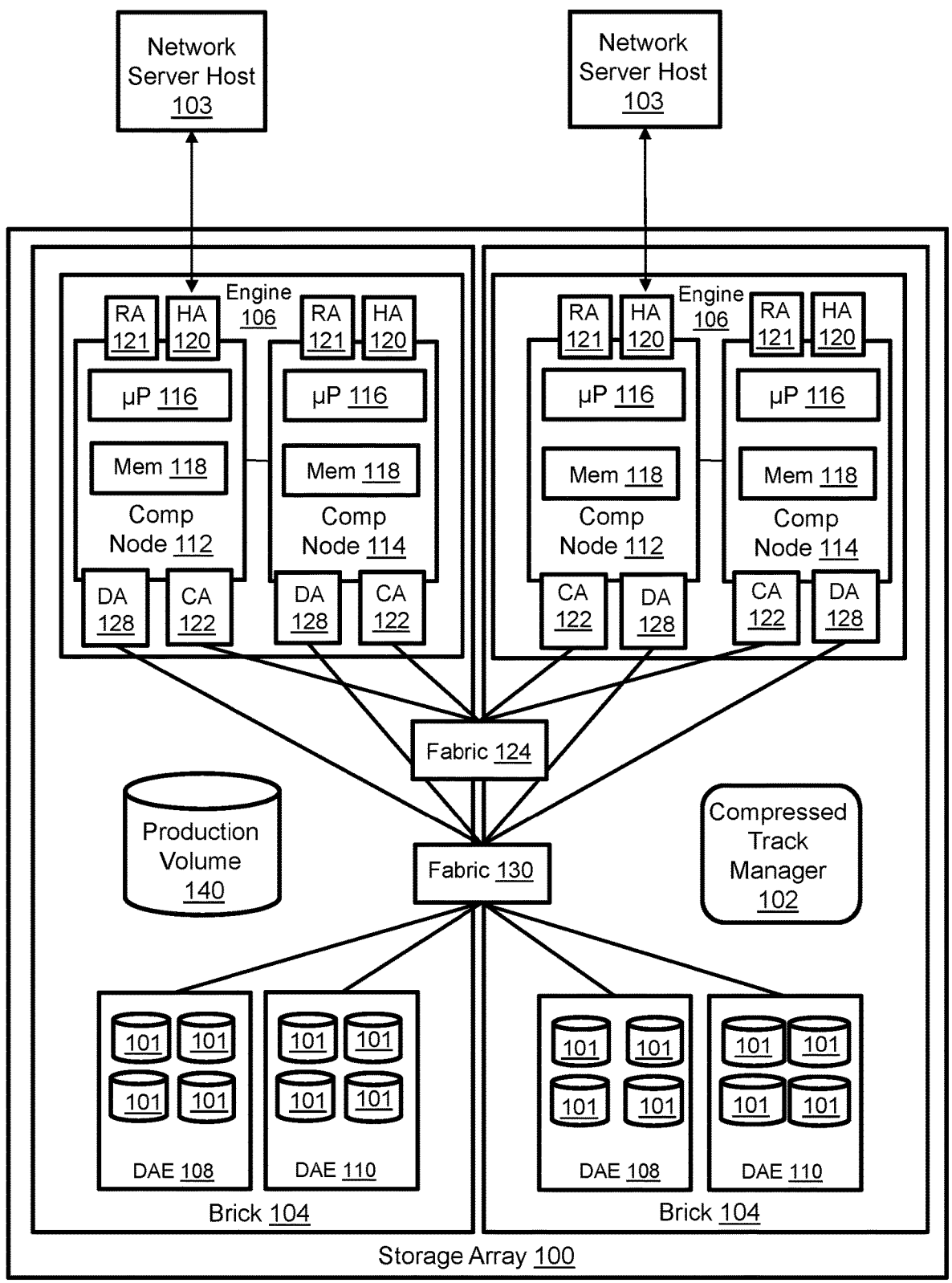
FIG. 1 illustrates a storage array with a compressed track manager that performs compressed track size classification and selects an optimal track size for compressed data based on that classification.

FIG. 1 illustrates a storage array 100 with a compressed track manager 102 that performs compressed track size classification and selects an optimal track size for compressed data based on that classification. The storage array is one example of a SAN, which is one example of a data storage system in which the compressed track manager could be implemented. Storage arrays and other types of SANs use different allocation units for internal and external IOs, where an allocation unit defines a fixed amount of storage capacity. It is a common design feature for a storage array to use only a single allocation unit for internal IOs in order to facilitate management of metadata. However, reliance on a single allocation unit can result in creation of fragmented "saved space" when data compression is implemented. For example, if the single internal allocation unit is a 128K track, and tracks of data that are compressed are compressed/decompressed independently, then each 128K track of storage in which compressed data is stored includes less than 128K of contiguous saved space. That saved space is typically non-contiguous with the saved space of the adjacent tracks so use of those small non-contiguous saved spaces tends to promote fragmentation. The aggregate amount of non-contiguous saved space can be reduced at the cost of somewhat more complex metadata management by using multiple reduced size allocation units of storage capacity for compressed data. For example, a storage system may use full-size 128K tracks to store uncompressed data and maintain pools of smaller reduced size tracks, e.g. 64K, 32K, and 8K, for storing compressed data. Efficiency is increased by selectively using the reduced size track that most efficiently accommodates the compressed data on a per-track basis, e.g. storing a 128K track of uncompressed data that compresses to 30K in a 32K track and storing a 128K track of uncompressed data that compresses to 6K in a 8K track. However, the increase in efficiency may be partially offset by increased frequency of data relocation. Data is changed in response to write commands from the hosts. Each write TO may increase or decrease the compressed size of the data. For example, a 128K track that initially compresses to 8K might only compress to 32K after a first write and at some future time after a subsequent write only compress to 64K. As a result, data may need to be relocated frequently to different ones of the reduced sized tracks. The overhead associated with data relocation tends to offset or reduce the benefits of enhanced efficiency associated with using multiple reduced size allocation units of storage capacity. As will be discussed in greater detail below, the compressed track manager helps to solve the problem and improve performance of the storage array by performing compressed track size classification to select an optimal track size for compressed data stored on a storage object. For example, the optimal track size for compressed data may be the only reduced size track that is implemented by the storage system for a selected storage object.

The storage array 100 depicted in a simplified data center environment in FIG. 1 supports two network server hosts 103 that run host applications. The hosts 103 include volatile memory, non-volatile storage, and one or more tangible processors. The storage array 100 includes one or more bricks 104. Each brick includes an engine 106 and one or more drive array enclosures (DAEs) 108, 110. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the SAN. Each compute node also includes a remote adapter (RA) 121 for communicating with other storage systems such as storage array 123. Each compute node also includes one or more drive adapters (DAs) 128 for communicating with managed drives 101 in the DAEs 108, 110. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A backend connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data (i.e. host application data) associated with the host application instances running on the hosts 103 is maintained on the managed drives 101. The managed drives 101 are not discoverable by the hosts 103 but the storage array 100 creates storage objects such as production volume 140 that can be discovered and accessed by the hosts. A production volume is a logical storage device that may be referred to as a production device or production LUN, where "LUN" refers to the logical unit number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is physically stored at potentially non-contiguous addresses on various managed drives 101. In other words, the production volume is an abstraction layer between the hosts and the managed drives.

Figure 2:
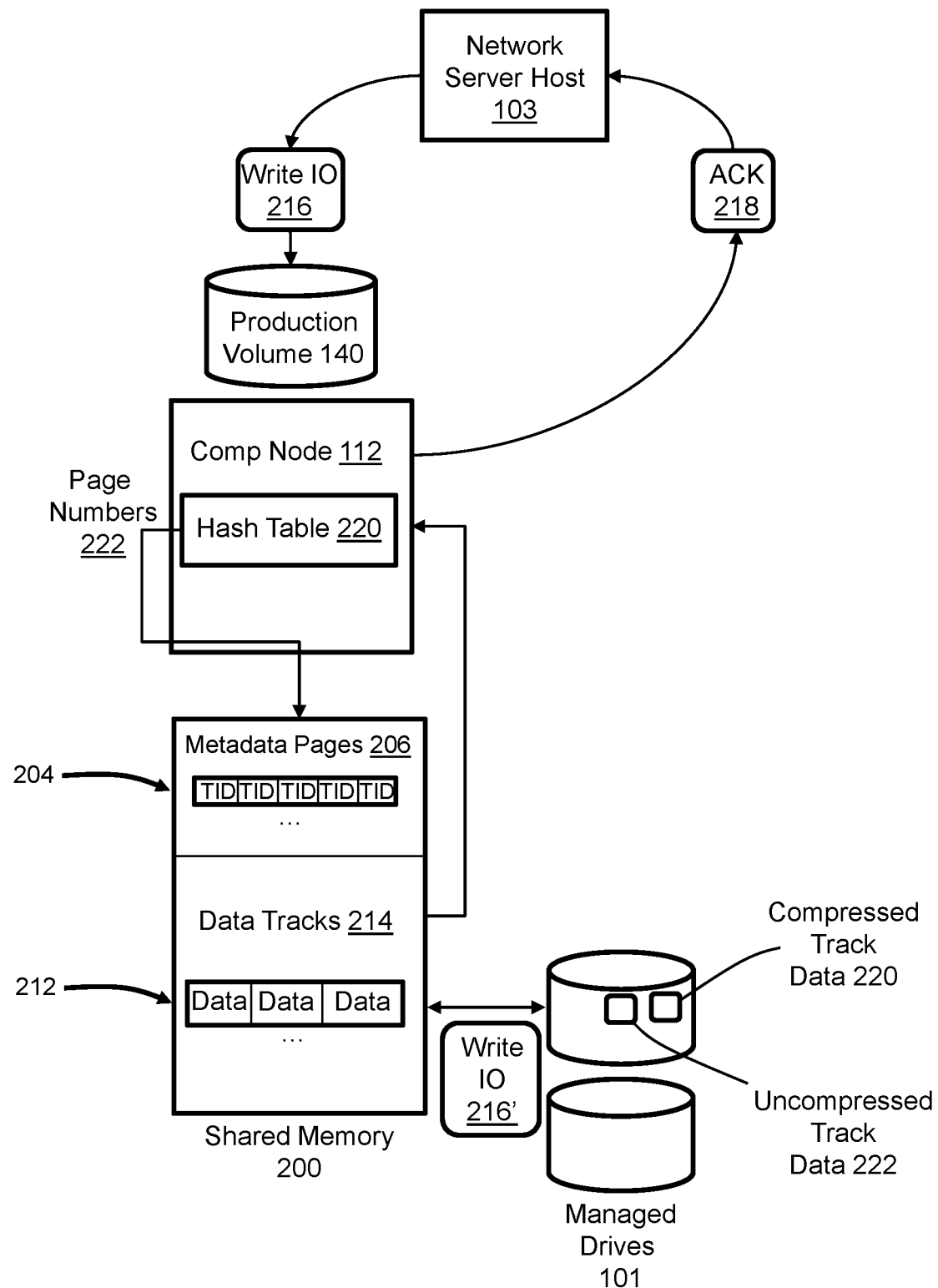
FIG. 2 illustrates processing of a write IO by the storage array of FIG. 1.

Referring to FIG. 2, each compute node (e.g. computer node 112) of the storage array dedicates a portion or partition of its respective local memory to a logical shared memory 200 that can be accessed by other compute nodes of the storage array, e.g. via direct memory access (DMA). A first portion 204 of the shared memory 200 is dedicated for storing metadata. A second portion 212 of the shared memory 200 is dedicated for storing production volume data. Fixed size metadata pages 206 in the first portion 204 include track identifications (TIDs) that indicate, among other things, where associated tracks of production volume data are located in the second portion 212 of the shared memory and the managed drives 101. Selected tracks 214 of the production volume data are copied from the managed drives 101 into the second portion 212 of the shared memory to service IOs. Tracks of data that are no longer required are destaged from the shared memory to the managed drives or, alternatively, flushed from the shared memory if the track data in the shared memory is redundant with the corresponding track data on the managed drives.

In response to an IO command 216 sent by a host 103 to write data to the production volume 140, compute node 112 uses a hash table 220 to obtain the page numbers 222 of the metadata pages 206 associated with the LBAs being written. Specifically, the device number, cylinder number, head, and size specified in the IO command are inputted to the hash table. The page numbers resulting from the lookup are used to find corresponding pages of metadata in the first portion 204 of the shared memory 200. The TIDs in those metadata pages are used to find and obtain the corresponding tracks of data in the second portion 212 of the shared memory. If the tracks associated with those TIDs are not in the shared memory, then those tracks are copied into the shared memory from the managed drives. After the data being written by the IO 216 is copied into the tracks 214 of the shared memory and the corresponding TID has been updated then an ACK 218 is sent from the compute node 112 to the host 103 to indicate that the write IO 216 has been processed. The updated data track is subsequently destaged to the managed drives 101 in the background using an internal write IO 216'. The data may be written as uncompressed track data or compressed track data. Write IO 216' differs from write IO 216 because a track is used as the allocation unit rather than blocks.

Figure 3:
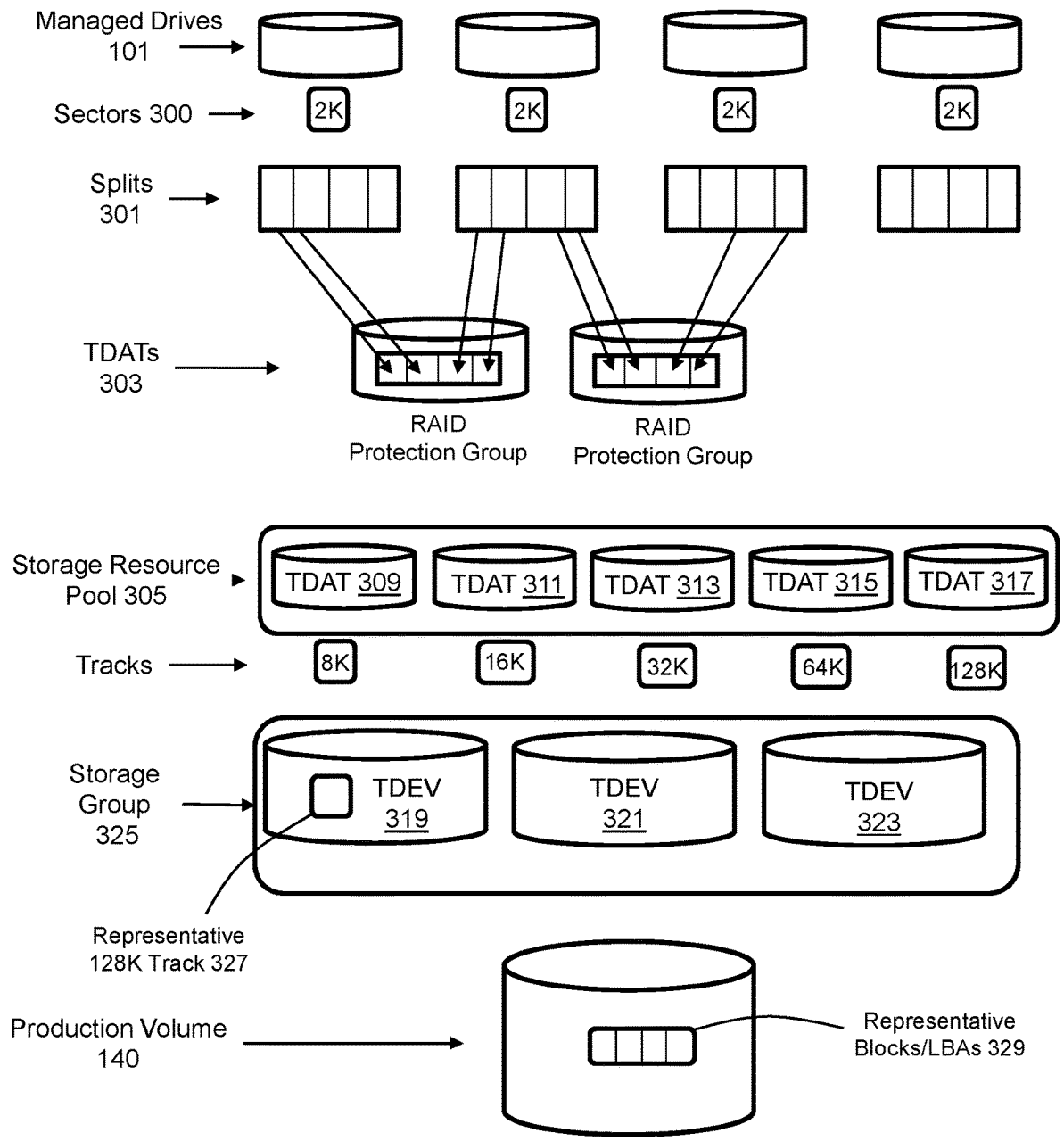
FIG. 3 illustrates hierarchical data structures of the storage array that relate the managed drives to a production volume.

FIG. 3 illustrates hierarchical data structures of the storage array that relate the managed drives 101 to the production volume 140 via multiple abstraction layers. The smallest unit of storage capacity that can be processed by a managed drive 101 is a sector 300. Different types of managed drives may be characterized by different sector sizes but for context and without limitation the sector size of all managed drive in the illustrated example is 2K. The managed drives 101 are each mapped into logical splits 301 of equal capacity. Each split includes a contiguous range of logical addresses. Selection of split storage capacity is a design implementation and, for context and without limitation, may be some fraction or percentage of the capacity of a managed drive equal to an integer multiple of sectors greater than 1. Groups of splits 301 from multiple managed drives are used to create data devices (TDATs) 303. The splits on each TDAT are organized as members of a RAID protection group. A storage resource pool 305, also known as a "thin pool," is a collection of TDATs 309, 311, 313, 315, 317 of the same emulation and RAID protection type. In some implementations all TDATs in a drive group are of a single RAID protection type and all are the same size (storage capacity). Different TDATs in the storage resource pool may be mapped for different track sizes. For example, TDAT 309 may have 8K sized tracks, TDAT 311 may have 16K sized tracks, TDAT 313 may have 32K sized tracks, TDAT 315 may have 64K sized tracks, and TDAT 317 may have 128K sized tracks. Logical thin devices (TDEVs) 319, 321, 323 are created using TDATs. The TDEVs implement only the full-size (largest) track size, e.g. 128K. Multiple TDEVs are organized into a storage group 325. The production volume 140 is created from a single storage group 325.

Host application data, which is stored in blocks on the production volume 140, is mapped to tracks of the TDEVs. A full-size track, which is an allocation unit of 128K capacity in the illustrated example, is larger than the fixed size blocks used in communications between the storage array and the hosts to access the production volume. Compressed tracks are initially stored on full-size tracks or on any of a variety of different reduced sized tracks selected based on comparison of compressed track size and implemented track size. For example, a 128K uncompressed track of a TDEV that compresses to 10K may be stored on TDAT 311 because the 16K reduced size tracks implemented on TDAT 311 are the closest track size larger than 10K. However, as will be explained below, the track sizes implemented by the TDATs and/or used for compressed data are adjusted based on compressed track size classification once an optimal track size for compressed data has been determined.

Raw compressed track size classification for a storage object is determined based on one or more representative uncompressed (e.g., 128K) tracks on the storage object. In the illustrated example a group of blocks/LBAs 329 of the production volume 140 corresponding to a 128K track 327 on TDEV 319 are selected to represent the storage array and/or production volume and/or TDEV. The representative blocks/LBAs may be selected based on activity level and compression state. For example, and without limitation, the blocks/LBAs on the production volume that have been most frequently written within a recent time window and stored as compressed data may be selected to represent the entire production volume.

One technique for selecting representative tracks from tracks that are being frequently written and compressed is to build a track level heatmap of data relocation. Data relocation statistics may be maintained for each storage group. Storage groups are ranked based on data relocation rate. One or more of the storage groups of the storage array may be selected based on the storage group rankings. TDEVs within each selected storage group may be ranked based on data relocation rate, e.g. using relocation counts represented within shared memory between host adapter emulation, data service emulation and disk adapter emulation. One or more TDEVs having the greatest relocation rate are selected and representative tracks within the selected TDEVs are selected based on ranked relocation rate. For each selected TDEV, K-means auto clustering machine learning algorithms are used to build 10 (or N) clusters based on incoming host IO logical block addresses. The top few (M) clusters characterized by a high density of IO's are selected. Each track in these top M clusters are selected for data analysis. P number of consecutive tracks nearby to this selected track are also chosen for further data analysis due to locality of reference. TO relocation statistics are also maintained at chunk level and each chunk is made up of P number of consecutive tracks. We rank these chunks in a time window T and pick the top (M number of) chunks which has high TO relocation counts for data analysis. Each track is choosen in a given chunk for further data analysis.

Figure 4:
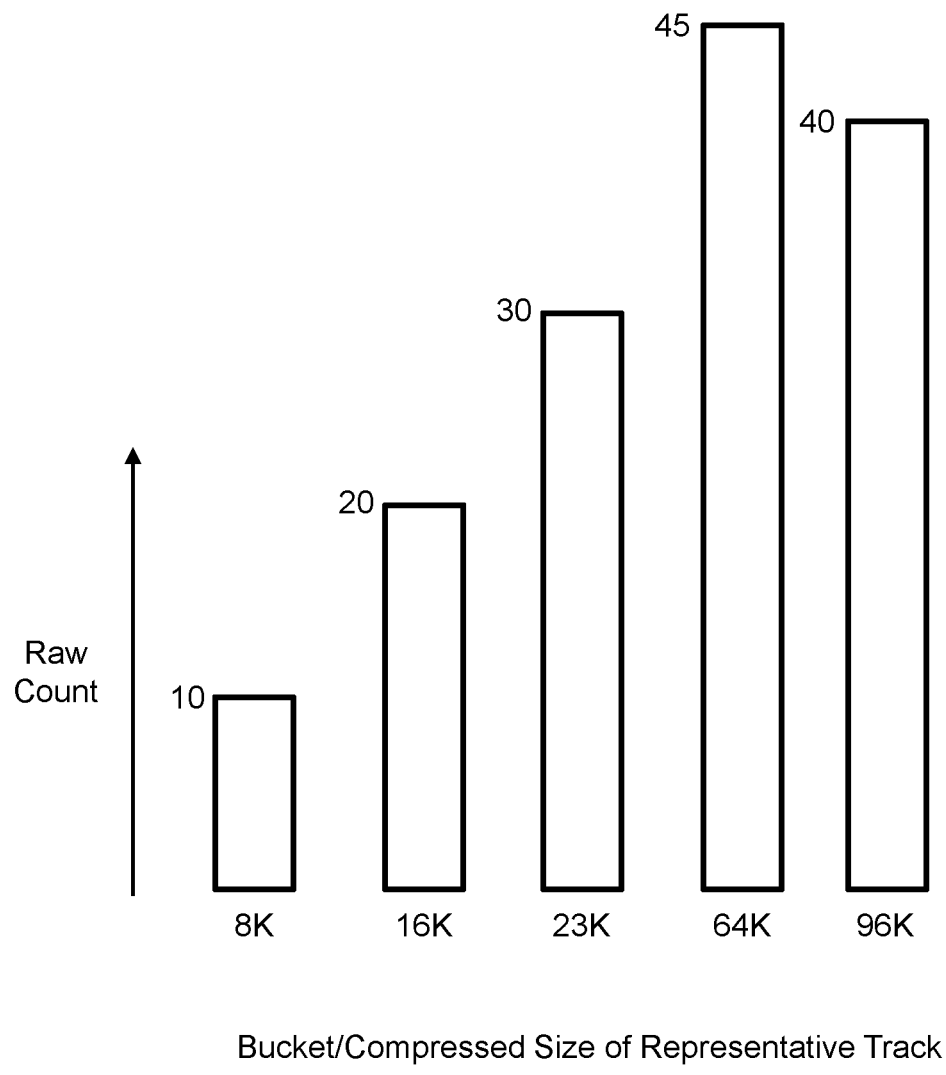
FIG. 4 illustrates raw compressed track size classification.

Referring to FIG. 4, each selected representative track is monitored for a predetermined amount of time to generate a statistical representation of changes in compressed track size over time. For example, buckets that represent compressed sizes of the representative track in 1K increments or increments corresponding to possible track sizes such as 8K, 16K, 32K etc. may be created. Counts are maintained for each bucket. Each time that the representative track is changed by a write in the predetermined time period, compressed and stored, the count of the bucket having a size corresponding to the compressed track size is incremented. For example, when the representative track compresses to 64K following a write then the count of the 64K bucket is incremented. The counting stops when some predetermined condition is satisfied, e.g. elapsed time. In the illustrated example final counts of 10, 20, 30, 45, and 40 were respectively recorded in buckets of sizes 8K, 16K, 23K, 64K, and 96K (not all of the buckets in 1K increments are shown) for a single representative track.

The bucket with the greatest final raw count could be selected as indicating the optimal size for compressed tracks of the storage array, production volume or TDEV. However, the bucket having the greatest raw count is not necessarily indicative of the optimal track size for compressed data. In the illustrated example a significant count (count=40) was recorded in the 96K size bucket although the 64K size bucket count (count=45) was greater. The relatively high final count of the 96K bucket suggests that a potentially significant amount of data would be relocated due to the compressed size of tracks exceeding 64K. Weighting can be used to help alleviate this situation while discriminating between buckets with significant counts and outliers.

Figure 5:
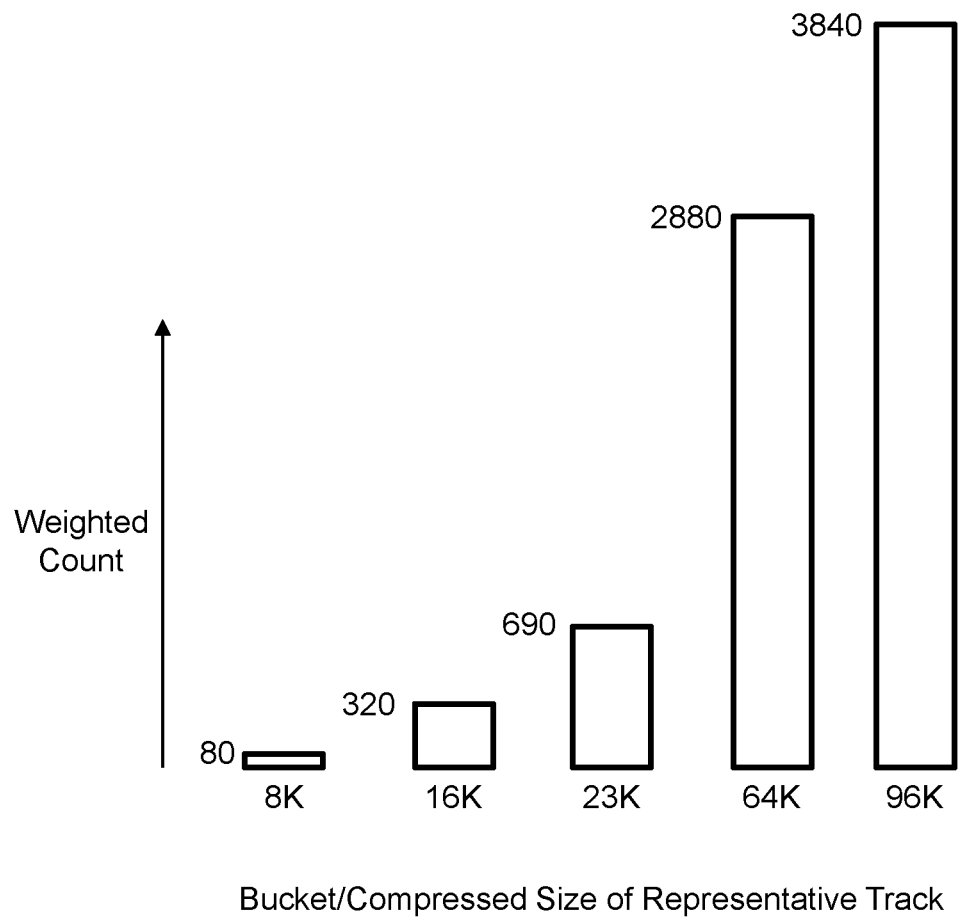
FIG. 5 illustrates weighted compressed track size classification.

FIG. 5 illustrates weighted compressed track size classification. The weight for each bucket is directly proportional to its compressed size multiplied by the bucket count. For example, the weight (W) may be calculated as W=Bucket Size Counter Value*(Bucket Size/100)$^P$, where P is a hyper parameter (W for each bucket is calculated using the same value of P). For example, and without limitation, P can be any value between 1 to N (by default it is 1). Referring to the illustrated example, the 8K sized bucket has a counter value 10 so the weight W is 10*8=80 for P=1. The weighted count of a bucket is equal to the raw count multiplied by the bucket weight so the weighted value of the 8K sized bucket in the illustrated example is 10*8=80. The weighted count of the 16K sized bucket is 20*16=320 The weighted count of the 23K sized bucket is 30*23=690 The weighted count of the 64K sized bucket is 45*64=2880. The weighted count of the 96K sized bucket is 40*96=3840. The weighted count 3840 of the 96K size bucket is greater than the weighted count 2880 of the 64K size bucket so the optimal size for compressed tracks in accordance with the weighted compressed track size classification is 96K. Outliers such as low count buckets representing larger compressed track sizes result in relatively small weights and therefore do not generate the greatest weighted count. Increasing the value of P reduces relocation cost by more greatly weighting larger IO sizes. Thus, a desired balance between optimal track size efficiency and relocation cost may be implemented by selecting an appropriate value of P.

Figure 6:
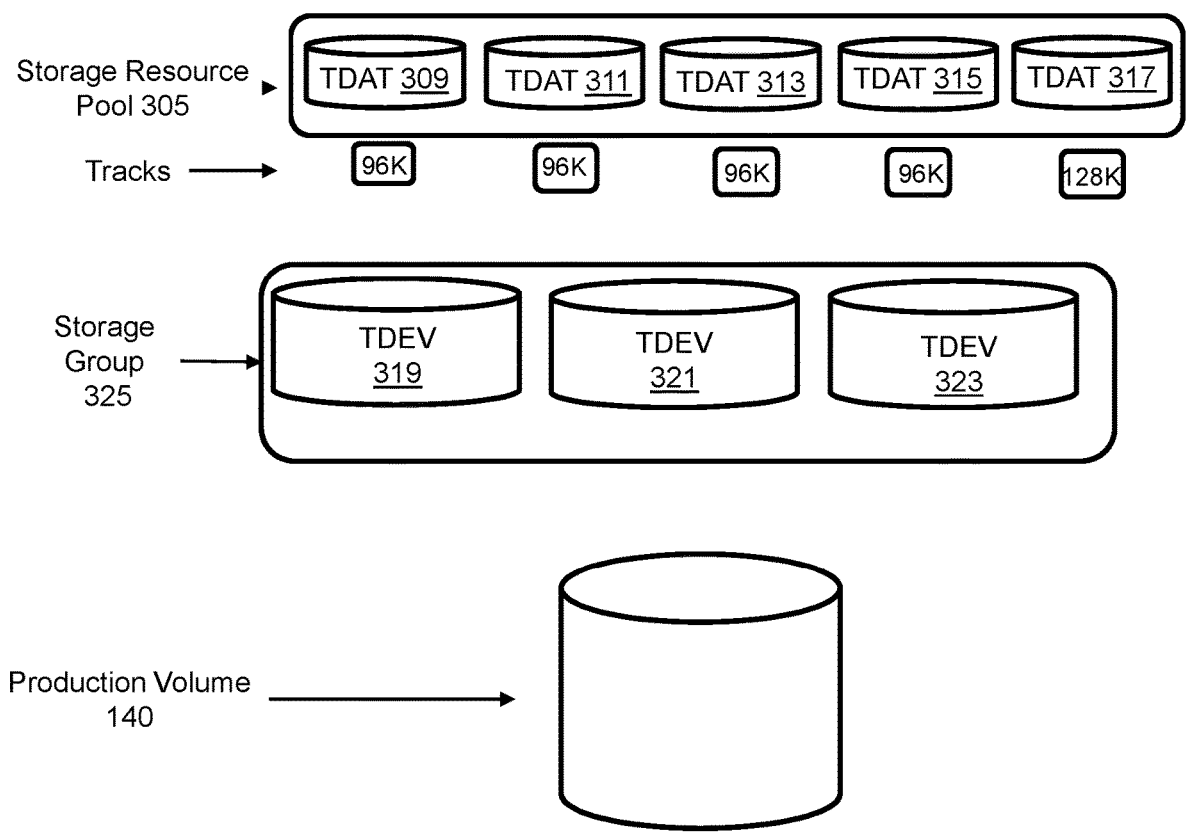
FIG. 6 illustrates implementation of a selected optimal track size for compressed data.

Referring to FIG. 6, responsive to selection of 96K as the optimal track size for compressed data, selected TDATs 309, 311, 313, 315 in the storage resource pool 305 may be updated to implement the selected optimal track size of 96K. In some implementations all TDATs that will be used to store compressed data are updated to implement only the selected optimal track size. Tracks of production volume data that compress to 96K or less (and are designated for storage in compressed form) in the illustrated example are stored on size 96K tracks. Tracks of production volume data that compress to greater than 96K are stored on size 128K tracks. Specifically, the tracks that compress to greater than 96K may be stored uncompressed. By calculating and using the selected optimal track size for compressed data as described above, the rate of data relocation is reduced relative to using multiple closely size-spaced allocation units as shown in FIG. 3 while reducing fragmentation relative to using only a single allocation unit. Consequently, disk fragmentation is reduced while the probability of in-place compressed write operations is increased.

There may be situations in which use of a single value of P produces skewed results. For example, similarly sized Write IOs in closely spaced bursts might dominate samples. In such situations different values of P may be used for one or more of the buckets. For example, the weight for the 8K bucket size may be calculated as W=Bucket Size Counter Value*(Bucket Size)$^X$, the weight for the 16K bucket size may be calculated as W=Bucket Size Counter Value*(Bucket Size)$^Y$, and the weight for the 96K bucket size may be calculated as W=Bucket Size Counter Value*(Bucket Size)$^Z$, where X, Y and Z are different values of the exponent P.

There may be situations in which in-place writes become undesirable, such as when a host application software upgrade causes the size of new Write IOs to change significantly. For example, a host may implement 16 k sized new Writes in-place to 96 k sized optimal tracks that were selected based on prevalence of 64K sized new Writes before the host application software upgrade. A virtual provisioning layer may track such changes and trigger selection of a new optimal track size for compressed data. The TDATs are then updated to implement the newly selected optimal track size for compressed data.

Figure 7:
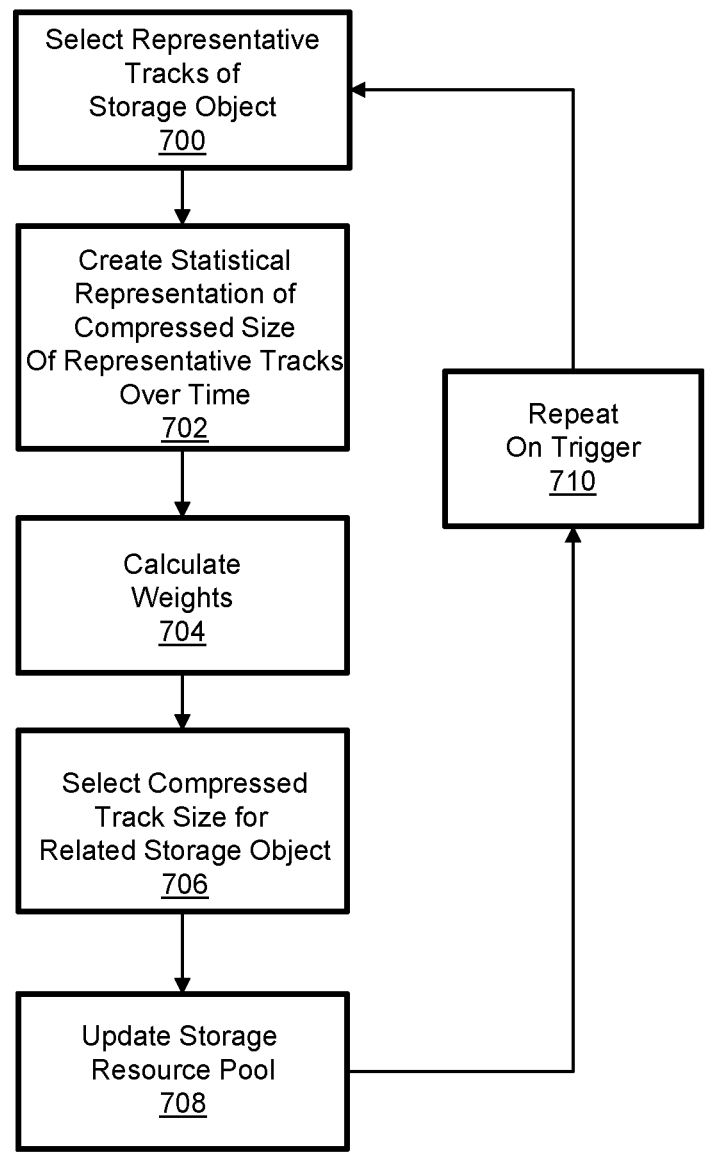
FIG. 7 illustrates steps associated with operation of the compressed track manager.

FIG. 7 illustrates operation of the compressed track manager. Representative tracks are selected as indicated in step 700. Selection may be accomplished by generating heatmaps as discussed above, for example, and without limitation. A representation of the compressed size of the representative tracks over time is created as indicated in step 702. This may be accomplished using the buckets described above, for example, and without limitation. Weights are calculated as indicated in step 704. This may be accomplished using the algorithm described above, for example, and without limitation. An optimal track size for compressed data is selected as indicated in step 706. This may be accomplished using the weighted counts described above, for example, and without limitation. The devices in the storage resource pool are updated as indicated in step 708. This may be accomplished by implementing only full-size tracks and the optimal reduced size track as described above, for example, and without limitation. Selection of the optimal track size for compressed data is repeated on trigger conditions as indicated in step 710. This may be accomplished using the virtual provisioning layer as described above, for example, and without limitation.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
   a data storage system comprising:
      a plurality of compute nodes interconnected with a plurality of drives that are accessible by the compute nodes only in full-size allocation units and reduced size allocation units that are characterized by smaller size than the full-size allocation units, wherein the compute nodes are configured to use the full-size allocation units for uncompressed data and use the reduced-size allocation units for compressed data;
      a storage object on which data is logically stored, the storage object data being physically stored by the drives; and
      a compressed data manager configured to:
         select at least one full-size allocation unit of representative data of the storage object;
         monitor changes in compressibility of the representative data over time;
         select a size for the reduced size allocation units for the storage object based on the changes in compressibility of the representative data over time;
         cause the compute nodes to use the full-size allocation units for storage of uncompressed data of the storage object on the drives; and
         cause the compute nodes to use the reduced size allocation units of the selected size for storage of only compressed data of the storage object on the drives.

2. The apparatus of claim 1 wherein the storage system uses only one size of reduced size allocation unit for storage of compressed data.

3. The apparatus of claim 1 wherein the compressed data manager weights a plurality of buckets corresponding to respective data sizes, and compares the data sizes of the weighted buckets to the monitored compressibility of the representative data to select the size for the reduced allocation units for the storage object.

4. The apparatus of claim 3 wherein each of the buckets has a Bucket Size that corresponds to a respective amount of compressibility of the representative data and an associated Bucket Size Counter Value that indicates how many times monitored changes in the compressibility of the representative data corresponded to the respective Bucket Size, the compressed data manager configured to weight the buckets using weights W=Bucket Size Counter Value*(Bucket Size/$100)^P$, where P is a hyper parameter to select the size for the reduced size allocation units for the storage object.

5. The apparatus of claim 1 wherein the compressed data manager selects the at least one full-size allocation unit of representative data based on frequency of write operations.

6. The apparatus of claim 1 wherein the compressed data manager selects the at least one full-size allocation unit of representative data based on frequency of relocation operations.

7. The apparatus of claim 1 wherein the compressed data manager selects the reduced allocation unit size based on changes in average compressibility of full-size allocation units of data.

8. A method comprising:
   accessing non-volatile drives only in full-size allocation units and reduced size allocation units that are characterized by smaller size than the full-size allocation units;
   selecting at least one full-size allocation unit of representative data;
   monitoring changes in compressibility of the representative data over time;
   selecting a size for the reduced size allocation units based on the changes in compressibility of the representative data over time;
   using full-size allocation units for storage of uncompressed data on the non-volatile drives; and
   using reduced size allocation units for storage of only compressed data on the non-volatile drives.

9. The method of claim 8 comprising using only one size of reduced size allocation unit for storage of compressed data.

10. The method of claim 8 wherein selecting the size for the reduced size allocation unit based on the changes in the compressibility of the representative data over time comprises weighting a plurality of buckets corresponding to respective data sizes, and comparing the data sizes of the weighted buckets to the monitored compressibility of the representative data.

11. The method of claim 10 wherein each of the buckets has a Bucket Size that corresponds to a respective amount of compressibility of the representative data and an associated Bucket Size Counter Value that indicates how many times monitored changes in the compressibility of the representative data corresponded to the respective Bucket Size, and further comprising weighting the values of the monitored compressed size by calculating a weight W=Bucket Size Counter Value*(Bucket Size/$100)^P$, where P is a hyper parameter.

12. The method of claim 8 wherein selecting the at least one full-size allocation unit of representative data comprises selecting based on frequency of write operations.

13. The method of claim 8 wherein selecting the at least one full-size allocation unit of representative data comprises selecting based on frequency of relocation operations.

14. The method of claim 8 comprising selecting the reduced size allocation unit size based on changes in average compressibility of full-size allocation units of data.

15. A non-transitory computer-readable storage medium storing instructions that when executed by a computer cause the computer to perform a method for using a computer system to implement multiple sizes of allocation units for storage of data, the method comprising:

accessing non-volatile drives only in full-size allocation units and reduced size allocation units that are characterized by smaller size than the full-size allocation units;

selecting at least one full-size allocation unit of representative data;

monitoring changes in compressibility of the representative data over time;

selecting a size for the reduced size allocation units based on the changes in compressibility of the representative data over time;

using full-size allocation units for storage of uncompressed data on the non-volatile drives;

and using reduced size allocation units for storage of only compressed data on the non-volatile drives.

16. The non-transitory computer-readable storage medium of claim 15 comprising using only one size of reduced size allocation unit for storage of compressed data.

17. The non-transitory computer-readable storage medium of claim 15 wherein selecting the size for the reduced size allocation unit based on the changes in the compressibility of the representative data over time comprises weighting a plurality of buckets corresponding to respective data sizes, and comparing the data sizes of the weighted buckets to the monitored compressibility of representative data.

18. The non-transitory computer-readable storage medium of claim 15 wherein selecting the at least one full-size allocation unit of representative data comprises selecting based on frequency of write operations.

19. The non-transitory computer-readable storage medium of claim 15 wherein selecting the at least one full-size allocation unit of representative data comprises selecting based on frequency of relocation operations.

20. The non-transitory computer-readable storage medium of claim 15 comprising selecting the reduced size allocation unit size based on changes in average compressibility of full-size allocation units of data.

* * * * *